(12) United States Patent
Mauger (10) Patent No.: US 6,483,842 B1
(45) Date of Patent: Nov. 19, 2002

(54) MULTIMEDIA SWITCHING SYSTEM

(75) Inventor: Roy Harold Mauger, Radlett (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/341,250

(22) PCT Filed: Feb. 19, 1998

(86) PCT No.: PCT/GB98/00521

§ 371 (c)(1),
(2), (4) Date: Jul. 14, 1999

(87) PCT Pub. No.: WO98/37664

PCT Pub. Date: Aug. 27, 1998

(30) Foreign Application Priority Data

Feb. 21, 1997  (GB) ............................................. 9703679

(51) Int. Cl.[7] ............................................. H04L 12/56

(52) U.S. Cl. ...................................... 370/420; 370/395

(58) Field of Search ................................ 370/230, 237, 370/238, 238.1, 351, 400, 395.2, 395.6, 395.61, 420, 395

(56) References Cited

U.S. PATENT DOCUMENTS

| | | |
|---|---|---|
| 5,440,551 A | 8/1995 | Suzuki |
| 5,594,732 A | 1/1997 | Bell |
| 5,764,645 A | 6/1998 | Bernet |
| 6,148,001 A * | 11/2000 | Soirinsuo ................ 370/420 |
| 6,341,131 B1 * | 1/2002 | Eneroth et al. ........... 370/395 |

OTHER PUBLICATIONS

Fischer, "Netzsymbiose Zum Gemeinsamen Erfolg", Telecom Report, vol. 19, No. 1, Jan. 1, 1996, pp. 35–38.
Armitage, "Multicast and Multiprotocol support for ATM based Internets", Computer Communications Review, vol. 25, No. 2, 4/95, pp. 34–36.
"MPOA Ties It All Together", Data Communications, vol. 25, No. 5, Apr. 1, 1996, pp. 120–124, 126.
Johnsson, "Support for Law Bitrate Applications in ATM Networks", Proceedings of IFIP Workshop, Jun. 3, 1996, pp. 39/1–39/14.
Toyoizumi, "A Study on Voice Communication Services for ATM Network", Proceeding of 1996 IEICE, vol. 2, 9/96, pp. 690–691.
Sazara. "Open Network", ASCII Corp., vol. 2, No. 2, Feb. 1, 1997, pp. 118–125.
Esaki, "High Speed Ip packet forwarding over internet using ATM technology", Proceedings SPIE, vol. 2608, 10/95, pp/ 44–52.
Saran, "An Empirical Evaluation of Virtual Circuit Holding Times in IP–Over–ATM Networks", Proceedings of CCC, vol. 3, Jun. 12, 1994, pp. 1132–1140.

* cited by examiner

Primary Examiner—David Vincent
Assistant Examiner—Robert W. Wilson
(74) Attorney, Agent, or Firm—Lee, Mann, Smith, McWilliams, Sweeney & Ohlson (57) ABSTRACT

A communications network arranged to provide multimedia switched services comprising a set of media components. The set of media components including IP traffic is encapsulated in an ATM virtual circuit and is switched as an entity using a robust signalling system so that the resultant connection records can then be employed for usage based tariffing purposes. This overcomes the problem of establishing billing records for connectionless traffic carried over a connection oriented network.

10 Claims, 8 Drawing Sheets

MULTIMEDIA SWITCHING SYSTEM

This invention relates to a system and method for transporting and switching multimedia digital communications traffic carried in asynchronous transfer mode (ATM) cells.

BACKGROUND OF THE INVENTION

A recent development in telecommunications technology has been the introduction of a number of new services such as video and data services. An increasing number of subscribers is receiving sets of such services as a multimedia package. It will be appreciated that the various services have respective different formats thus introducing the problem of defining a suitable transport mechanism for delivery of these services to the subscriber. This problem has been addressed by packetising the services into ATM cells that are routed by decoding information provided in the cell headers. For interactive multimedia communication to be of value to an operator it is necessary to find some way in which the user can be charged or billed for participation in the communication in a way which is robust in terms of the accuracy of the billing records and reflects his actual use of the network. The IP real-time protocols are however not suitable for this purpose as they are best effort only and, additionally, they represent just a small component of a typical multimedia communication session.

A method of transporting multimedia traffic over a digital packet switching network is described in specification No EP-A1-0,786,919. A method of implementation of ATM adaptation layer functions is described in specification No EP-A2-0,720,410. A description of ATM networks for narrow band connections is given in specification No WO-95/17789. Reference is also directed to the ITU H.323 set of multimedia conferencing standards.

The above described incompatibility between the two types of traffic arises primarily from the different nature of IP traffic and conventional voice traffic. Voice traffic is connection oriented in that there is a requirement for the setting up of a virtual channel to establish a voice call and billing for this channel can be readily determined. IP traffic on the other hand is connectionless in nature and comprises a series of information packets each having a destination address. It is not uncommon for packets destined for the same address to reach that address via different routes. This makes billing for these services a difficult and uncertain operation. Further, the increasing number of these services has exacerbated the problem of appropriate billing to ensure that each service provider is credited with the respective service use.

SUMMARY OF THE INVENTION

An object of the invention is to provide an improved apparatus and method for providing multimedia services to telecommunications subscribers.

A further object of the invention is to provide an effective method of billing IP traffic in a connection oriented network.

According to one aspect of the invention there is provided a communications network arranged to provide multimedia switched services comprising a set of minichannel media components, wherein said set of minichannel media components is encapsulated in an ATM virtual circuit and is switched as an entity so as to provide connection records for usage based tariffing purposes, wherein the minichannel components carry IP protocols and are switched using IP cut-through routing applied at the adaptation switching layer.

In a preferred embodiment, the minichannel components carrying IP protocols are switched using IP cut-through routing techniques such as the ATM Forum Multi-protocol over ATM (MPOA) applied at the AAL-2 Adaptation Switching layer.

According to another aspect of the invention there is provided a multilayer switching network having three layers, an ATM Core layer, an ATM Virtual LAN layer and an ATM adaptation switching layer to provide multimedia services to a user community.

According to a further aspect of the invention there is provided a method of delivering multimedia switched services to subscribers in a network, the method including encapsulating a set of minichannel media components in an ATM virtual circuit, and-switching the encapsulated set of media components as an entity so as to provide connection records for usage based tariffing purposes, wherein the minichannel components carry IP protocols and are switched using IP cut-through routing applied at the adaptation switching layer.

The user community may either be located on large campus sites with ATM virtual LAN switches or in small offices or home offices that are too small for such switches.

Advantageously, users may combine directly connected media sessions with known Quality of Service together with Internet media sessions with best effort QOS.

Preferably, services are based on the ITU H.323 set of multimedia conferencing standards.

BRIEF DESCRIPTION OF THE DRAWINGS

An embodiment of the invention will now be described with reference to the accompanying drawings in which:FIG.

DESCRIPTION OF PREFERRED EMBODIMENT

Figure 1:
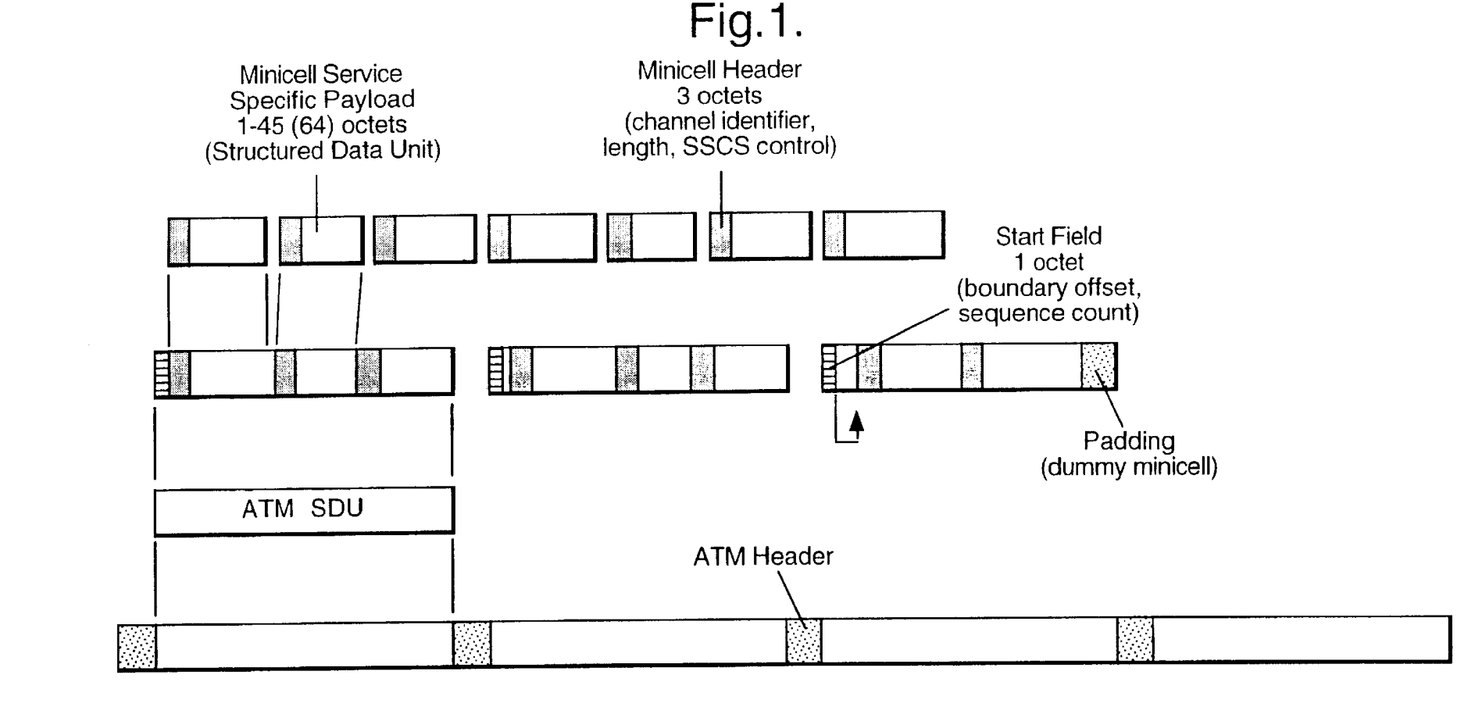
FIG. 1 illustrates the multiplexing of minicells into ATM.

Reference is first made to FIG. 1 which illustrates AAL-2 multiplexing and is introduced for explanatory purposes. The AAL-2 adaptation layer has been optimised to cope with the demands of low bit-rate communications, representing the increasing trend to greater voice compression. The adaptation layer is a multiplex of users in a single ATM connection, where each user's information is carried in a short packet or minicells, with a header identifying the user channel with ancillary control information. This is illustrated schematically in FIG. 1.

By sharing the fixed length payload of the ATM cell between users, the need to compromise by trading cell assembly delay for bandwidth efficiency is avoided thus overcoming a problem which would be acute at low bit-rates and on expensive leased lines. AAL-2 adaptation equipment performs a concentration function to ensure high utilisation, but can also limit the holdover delay of traffic when usage is low.

A further feature of minicells is that they may be of variable size, from 1 to 64 octets, to accommodate a wide variety of applications with minimal overhead. Thus the mapping to ATM cells is asynchronous and in fact quite independent of the length of an ATM cell. The boundary of minicells in the ATM cell payload is signified in every cell by a start field (STF), which specifies the offset, and thus minicells form a self-delineating flow.

We have found that the AAL-2 protocol format can be employed to carry minicells transparently over access systems which have fixed frame formats other than ATM cells, such as MPEG-2 transport stream. In fact minicells do not require an ATM cell or other frame structure at all, as it is possible to map the start field octet once every 48 octets with minicells in the intervening octet positions directly onto any physical bearer. The bearer identity can be used to regenerate the implicit ATM cell headers where the VCC needs to be transported over conventional ATM transmission.

The minicell is structured so that services of different types can be supported as Service Specific Convergence Sublayers (SSCS), all carried over the minicell Common Part Sublayer (CPS) identically. The minicell header includes channel identity, length and User-to-User Information (UUI), the latter allows the functions of an SSCS to be specialised according to purpose. For example, low bit-rate voice has a natural frame or sample interval, which in the case of G.729 CS-ACELP is a packet ten octets long. This packet length could form a minicell payload directly, and in this case the SSCS has null functionality. Alternatively a data frame, such as GSM mobile packets, are typically much greater than 64 octets, so a Segmentation and Re-assembly (SAR) SSCS function supports such application. The SAR function can be assisted by using the UUI field between adaptation entities to ensure proper sequenced re-assembly of the data packet.

In our arrangement, minicells provide a universal adaptation medium able to support voice, video and data in a common ATM VCC. In the access segment of the network, such a connection can be carried transparently over video distribution systems using MPEG transport stream, narrow band systems with 64 kb/s capacity, n×64 kb/s, or a modem channel without any loss of flexibility or efficiency. The result is a multimedia service transport which is transparent to practically all physical transport systems, but which is at the same time fully integrated into ATM.

Figure 2:
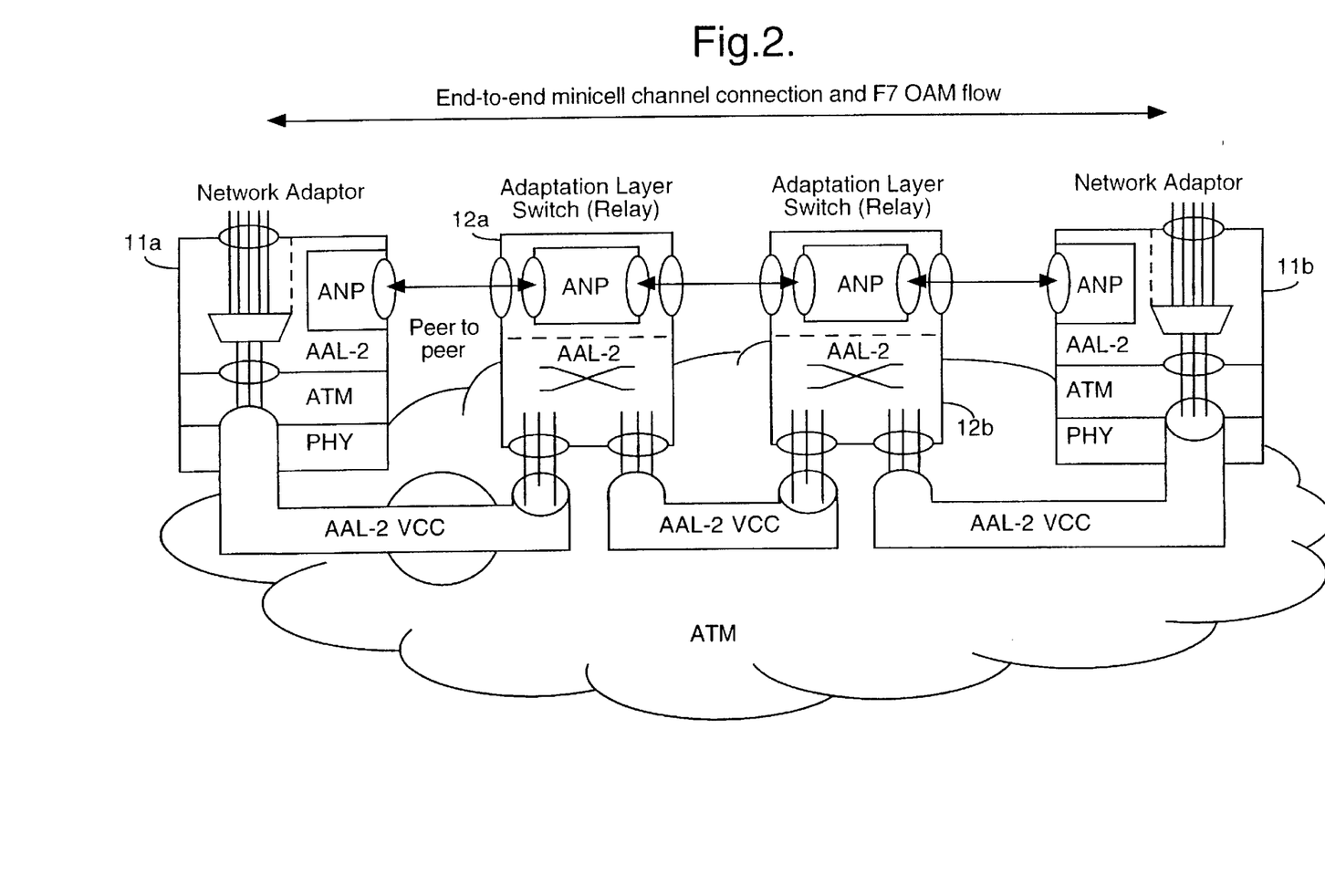
FIG. 2 is a schematic diagram of an ATM network illustrating end to end minicell connection and traffic flow.

Referring now to FIG. 2, this illustrates end to end flow of traffic between network adaptors 11a, 11b via adaptation layer switches 12a, 12b. The AAL-2 standard specifies a feature that allows minicells to be relayed between connections, without the need to terminate the carried service. This provides the ability to establish and control a minicell channel (adaptation layer) connection across many nodes forming an Adaptation Layer Switching network. In the network of FIG. 2, sets of media components are encapsulated each in an ATM virtual circuit which is switched as an entity using a robust signalling system so that the resultant connection records are reliable for usage based tariffing purposes.

The ITU (International Telecommunications Union) has specified a standard for a new adaptation layer for low capacity services for which the standard cell size of 48 bytes payload is too large. The standard 1.363.2 B-ISDN ATM Adaptation Layer 2 specifies a minicell short data unit that can be 1 to 64 bytes and which shares an ATM virtual circuit (VC) with other similar users. This VC is specified as having a DBR (deterministic bit rate) traffic type so that bandwidth is allocated in the ATM network for the peak cell rate. The standard incorporates a signalling minicell channel that can be used to dynamically add and remove users so that dynamic bandwidth management is available end-to-end over the allocated DBR channel.

The AAL-2 standard further specifies a feature that allows minicells to be relayed between nodes to provide a minicell channel connection across many nodes in a minicell channel network. This feature addresses a problem in wireless networking whereby a mobile to mobile call is preferably established without transcoding to PCM, the initial connection being across a single switch. However with the mobility of the terminal, the connection may proceed through a succession of hand-overs thereby requiring an end to end minicell channel connection. This is illustrated in FIG. 2. The switching operation is controlled by the AAL negotiation procedure and the connection is supported by in-band F7 minicells to provide the normal standard connection maintenance capabilities of ATM. Having once established a minicell switching layer, this layer can then be used for many other applications in addition to supporting mobile hand-over functions.

The set-up, maintenance and clear-down of minicell channels in an AAL-2 connection, and the switching operation of the relay, is controlled by the AAL-2 Negotiation Procedures (ANP). AAL-2 connections are supported by in-band F7 OAM minicells, replicating for the adaptation layer the connection maintenance capabilities of ATM.

Supporting IP Protocols in ATM

We have found that ATM networks are able to support IP at either the virtual LAN (Layer-2) or the network layer (Layer-3) of the IP protocol. At layer 2 they provide a multicast function to achieve transparency for legacy applications i.e. ATM Forum LAN Emulation. At Layer-3, they operate on the basis of cut-through routing which provides the functions usually provided by routers on a normal IP network. In the ATM Forum multi-protocol over ATM (MPOA) standard, a route server is addressed to perform route queries and firewall functions. If all is well, then an ATM VC is set up to deliver packets between Virtual LANs. The operation of ATM at Layer 3 is compatible with frame or hybrid Frame/Cell switches at Layer-2. Other forms of cut-through routing have been defined such as the Integrated-PNNI (I-PNNI) which adds further functionality to the Route Server, in addition there are a whole range of cut-through routing schemes which are not specifically related to ATM. Although our arrangement is described with particular reference to MPOA as the cut-through routing scheme, it will be understood that the same principles apply for other schemes.

Multimedia Usage Based Tariffing

Within IP, the protocols that deal with real-time services are Real-time Protocol (RTP), Real-time Control Protocol (RTCP) and the Reservation Protocol (RSVP). The paradigm for the operation of this set of protocols is that of a multi-point to multi-point conference. RTP is the protocol which carries voice or video packets in a single direction on a point to multi-point link from a source to all receivers.

RSVP is a protocol which acts in a reverse direction from receivers back to senders which reserves buffer space and capacity in routers to allow the downstream RTP packets to achieve their Quality of Service (QOS) requirements. This reservation is a soft state which needs renewing on a regular basis in order to maintain the QOS. The RTCP provides communication in the reverse direction multi-point to point which reports on the Quality of Service actually achieved and provides additional control functions such as RTCP-Bye which is used to terminate a real-time flow. As with all IP protocols the design is for best effort delivery. In the real-time case it is assumed that lost packets would have no value if retrieved and no effort is made to retrieve them by repeat transmission. As an example if the RTCP-Bye packet is lost then a time-out on lack of received RTCP packets of about 10 to 20 minutes would be used to deduce disconnection and retrieve network resources.

The IT industry is planning to provide Multimedia PCs implementing H323/4 standard video conferencing, H323 also includes a H225 call control which is Q931/RFC 1006/IP which provides reliable message transport, this can be used to set up the network resources that are exploited by the IP real-time protocols to achieve the conferencing function. This solution is termed "multi-layer switching".

Multi-layer Switching

The concept of multi-layer switching is generally discussed in the context of IP separation between Layer-2 switching and layer-3 switching. In this concept we have three layers: the core ATM network layer; an IP layer-2 switching layer; and the ATM adaptation switching layer.

Figure 3:
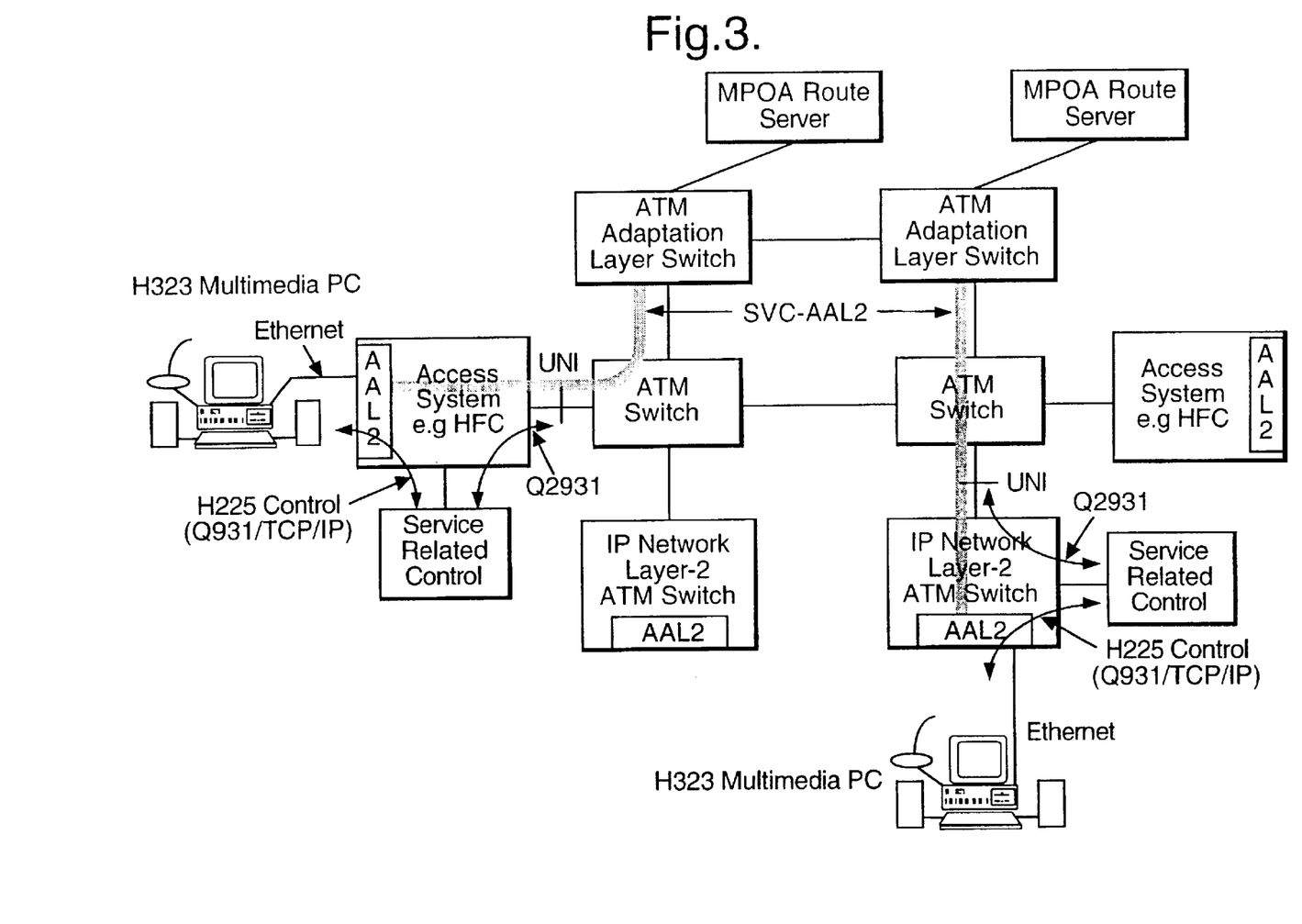
FIG. 3 shows a multimedia switching network architecture employed in the network of FIG. 2.

For switched multimedia services, as illustrated in FIG. 3, multimedia terminals connected either through an IP layer-2 switch or directly through an access system, to the Core ATM network, have H225 control links to a Service Related Control function. Service Related Control comprises:an an originating point for Q2931 proxy signalling;

an originating point for the generation of connection records;

authentication;

ATM/IP address resolution.

On initiation of a service session, the Service Related Control function will initiate an AAL-2 SVC connection to the ATM Adaptation Layer Switch network with a predetermined DBR bandwidth allocation. The bandwidth will be adequate for the full multimedia service and will be dynamically shared between voice, video and data media components which are transparently invoked between the terminals and the ATM Adaptation Layer switch. The ATM Adaptation Layer switch network provides a full IP Routing function between all of the media components which can be freely invoked from the terminals.

Figure 4:
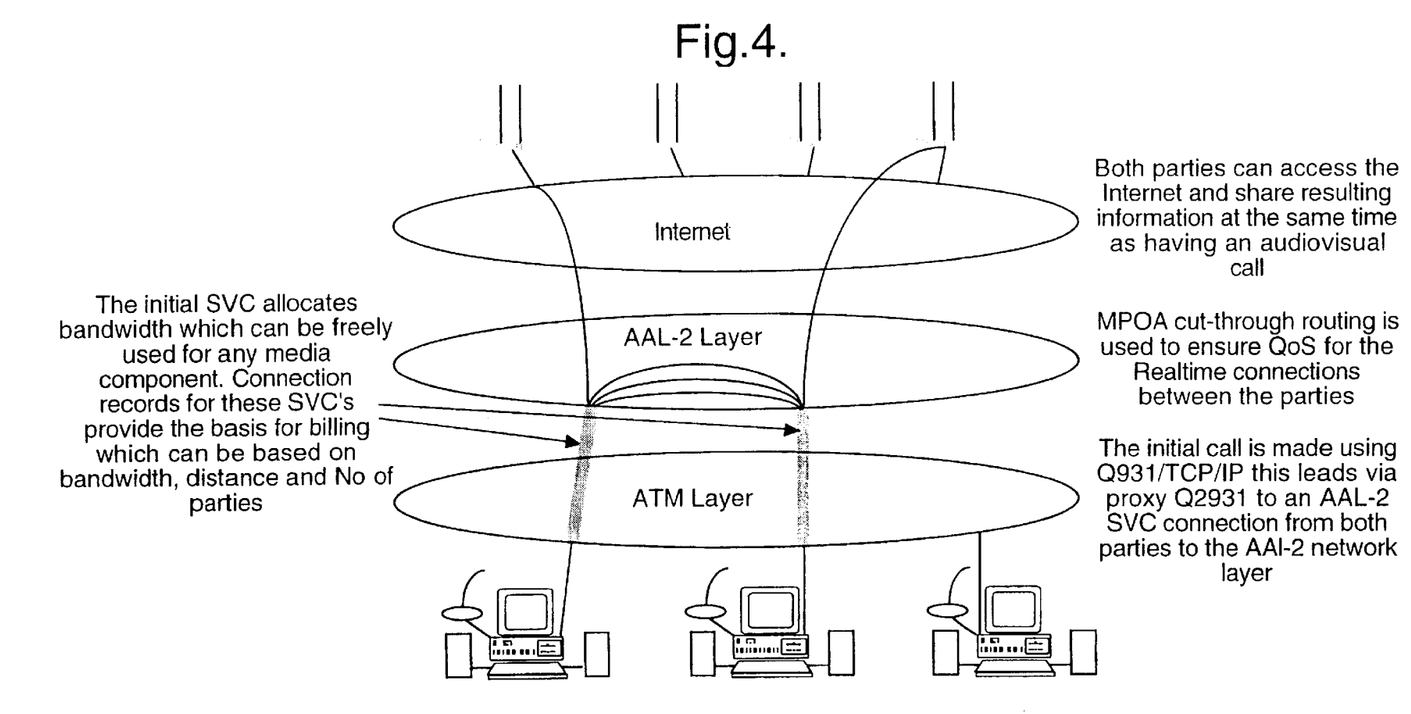
FIG. 4 illustrates and arrangement for providing multimedia telephony with Internet browsing.
Figure 5:
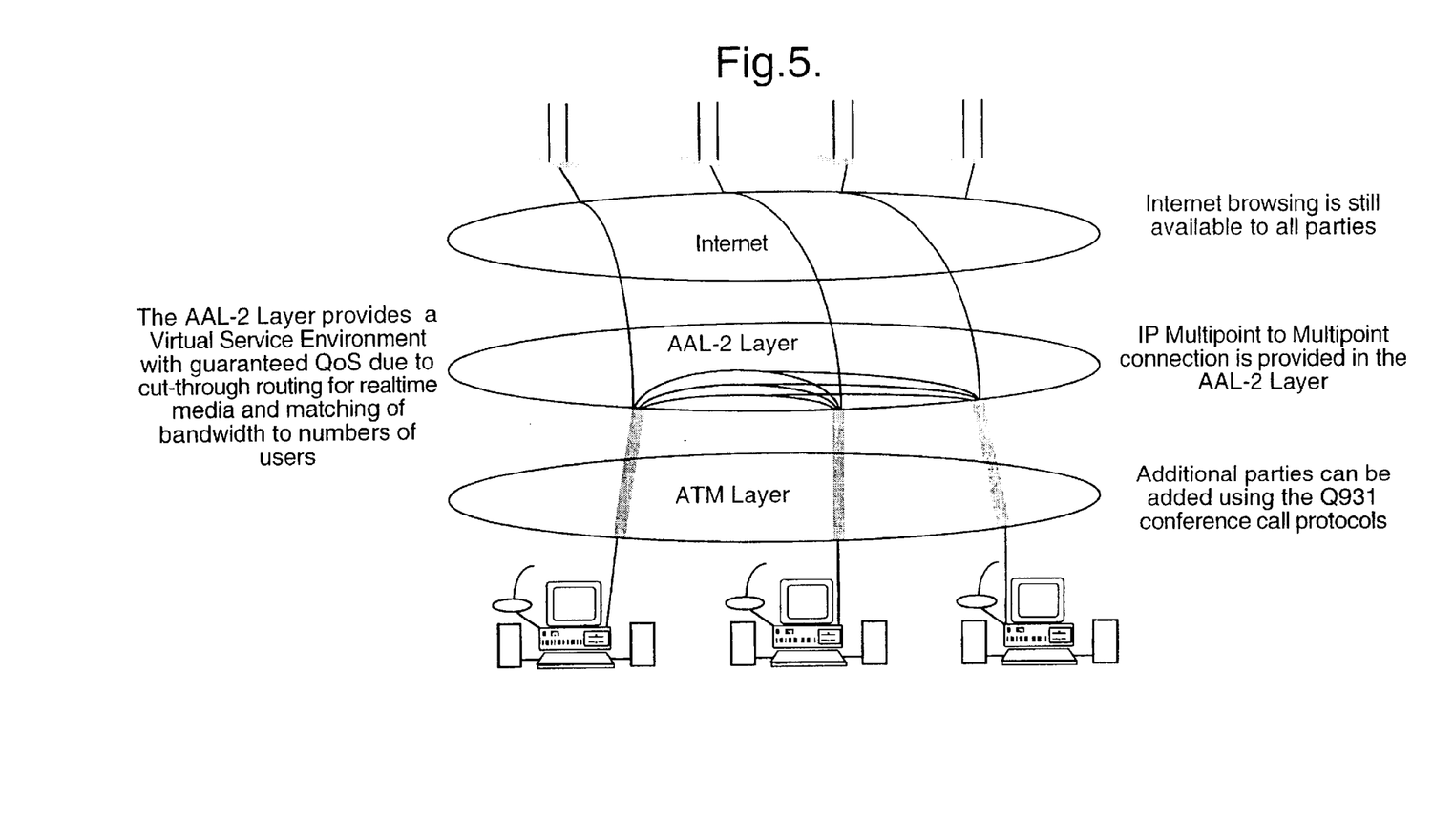
FIG. 5 illustrates multimedia conferencing in the network of FIG. 2.

The service potential of this concept is illustrated in FIGS. 4 and 5. In FIG. 4 which illustrates schematically multimedia telephony with Internet browsing, service is requested between two parties. Within the H.323 umbrella this service can embody Voice, Video and white board data conferencing, these can be switched as directly routed AAL-2 minislots between the terminals. The bandwidth allocated to the terminals can also include capacity for further IP communication sessions so that the users can for example search the Internet for items of common interest and share the results.

In FIG. 4, user terminals 41a and 41b can have simultaneous access to Internet servers 42 by the use of a switched virtual channel (SVC). The initial SVC allocates bandwidth which can be used by any media component, and connection records for these SVCs provide the basis for billing which can be based on bandwidth, distance and number of parties. As shown in FIG. 4, both parties can access the Internet and share resulting information at the same time as having an audio-visual call. MPOA (multi-protocol over ATM) cut-through routing is used to ensure quality of service for the real time connections between the parties. The initial call is made e.g. using Q931/TCP/IP protocol and this leads via Q2931 to an AAL-2 SVC connection from both parties to the AAL-2 network layer.

FIG. 5 extends the above basic principle to three or more parties, i.e. terminals 41a, 41b and 41c. The parties are invoked by Q 931 signalling from the terminals which lead to additional AAL-2 VC's being established to the ALS layer, within which-the individual minichannels are switched using IP switching. This is all achieved by the general IP switching capability of the Adaptation Layer Switching network layer. The AAL-2 layer provides a virtual service environment with a guaranteed quality of service (QoS) as a result of cut-through routing for real time media and matching of bandwidth to the number of users. Internet browsing is available to all parties. The AAL-2 layer provides multipoint to multipoint connection. Further parties can be added using the Q931 conference call protocols.

The value of this approach is that:

it exploits the installed base of multimedia PCs for H323 conferencing;

it uses H225 and Q2931 signalling for robust establishment and tear-down of a virtual service environment so that connection records form a suitable basis for usage based tariffing, this can be based on bandwidth, number of parties and geographical distance;

it allocates bandwidth to the virtual service environment so that services can achieve a known quality of service rather than a best effort quality of service;

the AAL-2 protocol works transparently over ATM, MPEG-2 transport and low capacity DS0, nxDS0 or Modem links i.e. all environments which are envisaged to support multimedia terminals.

ALS System Architecture

Figure 6:
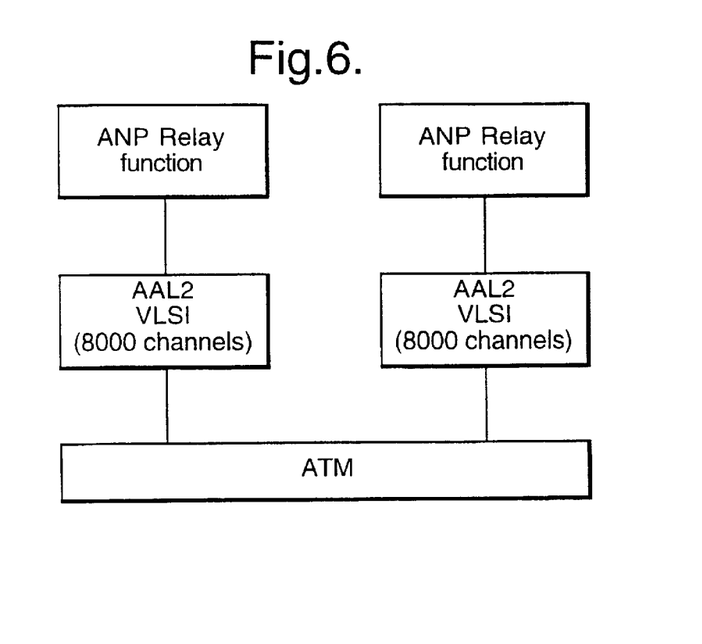
FIG. 6 shows in schematic form the architecture of an adaptation layer switch employed in the network of FIG. 2.
Figure 7:
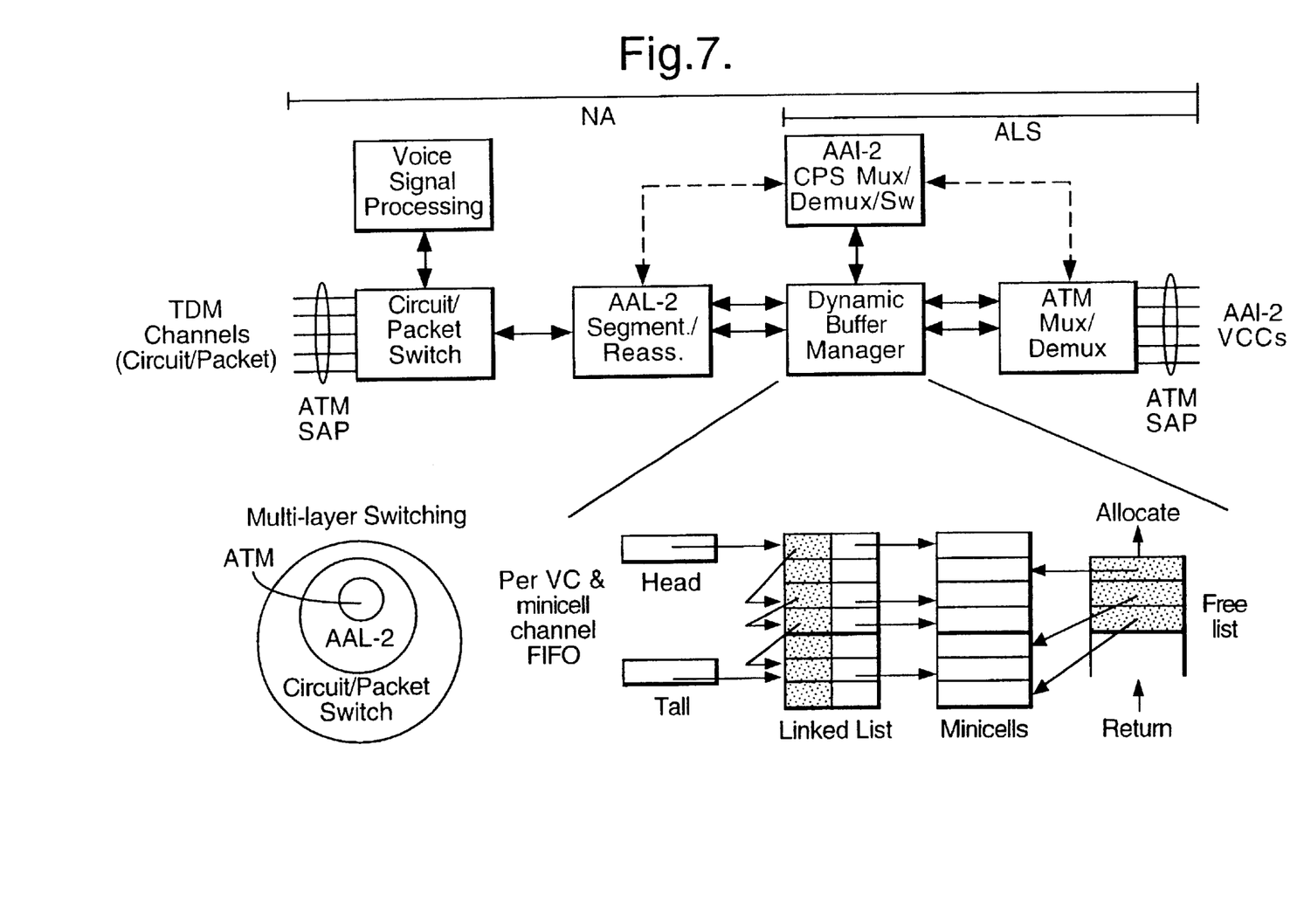
FIG. 7 shows the construction of the adaptation layer switch of FIG. 6 in further detail.

FIG. 6 illustrates the architecture of a modular implementation of an Adaptation layer switch implementing one of the relay nodes shown in FIG. 2. The VLSI realisation of a switch module is shown in FIG. 7. The operation of the key functional blocks is to perform a multi-layer switching operation. The ATM switching has not been shown, but as a switching core it achieves scaling by acting as a virtual connectivity backplane. Around the core is the adaptation switching ring, and around that is the service specific switching that performs circuit or packet switching.

The VLSI architecture comprises:

TDM Service Access Point (SAP) that is the association between the adaptation layer and TDM channels for synchronous circuits or asynchronous packets;

a Dynamic Channel Switch (DCS) that performs a concentration function by dynamically mapping TDM channels to AAL-2 VCs and mini-cell channels, a cross-connection function for exchange between optional voice processing devices or minicell channels and multi-cast capability; an AAL-2 Segmentation and Reassembly function that exchanges circuit or packet based TDM channels to and from the payload of minicells; a dynamic buffer management function that forms a common shared memory architecture to provide a dynamic amount of buffering per AAL-2 VC and minicell channel, plesiochronous buffer control, cell delay variation compensation and the adaptation layer space switch matrix;

an AAL-2 multiplexing, demultiplexing and switching control function that operates on the dynamic FIFO queues in the buffer;

and an ATM multiplexing, demultiplexing and optionally switching function that interfaces to the network or an ATM backplane and forms the ATM Service Access Point (SAP).

The organisation of the dynamic buffer is in the form of indirected linked lists of equally sized slots of memory. The difference between the head and the tail of the list is effectively the amount of stored information that is converted into units of time according to the TDM service, the packet size and bit rate represented. A dynamic buffer is required for AAL-2 because, although for a DBR service the cell delay variation has a fixed maximum, the number of users can vary dynamically and the buffer size is thus required to vary as a function of the number of configured users. For synchronous services a constant mean time difference is maintained between head and tail. For plesiochronous compensation, this is monitored for slowly changing trend and a slip or a stuff invoked to meet standards requirements by an amount appropriate to the service. For CDV compensation, this is achieved by setting the time difference slightly in excess of the amount of configured CDV: this is monitored frequently. A training algorithm determines the smallest cell transfer delay (minimum CDV or earliest cell) which is unchanging under load. Thus only lost or late minicells need be compensated by detecting onset of buffer under flow and using the previous stuff mechanism.

Access Network Architecture

Figure 8:
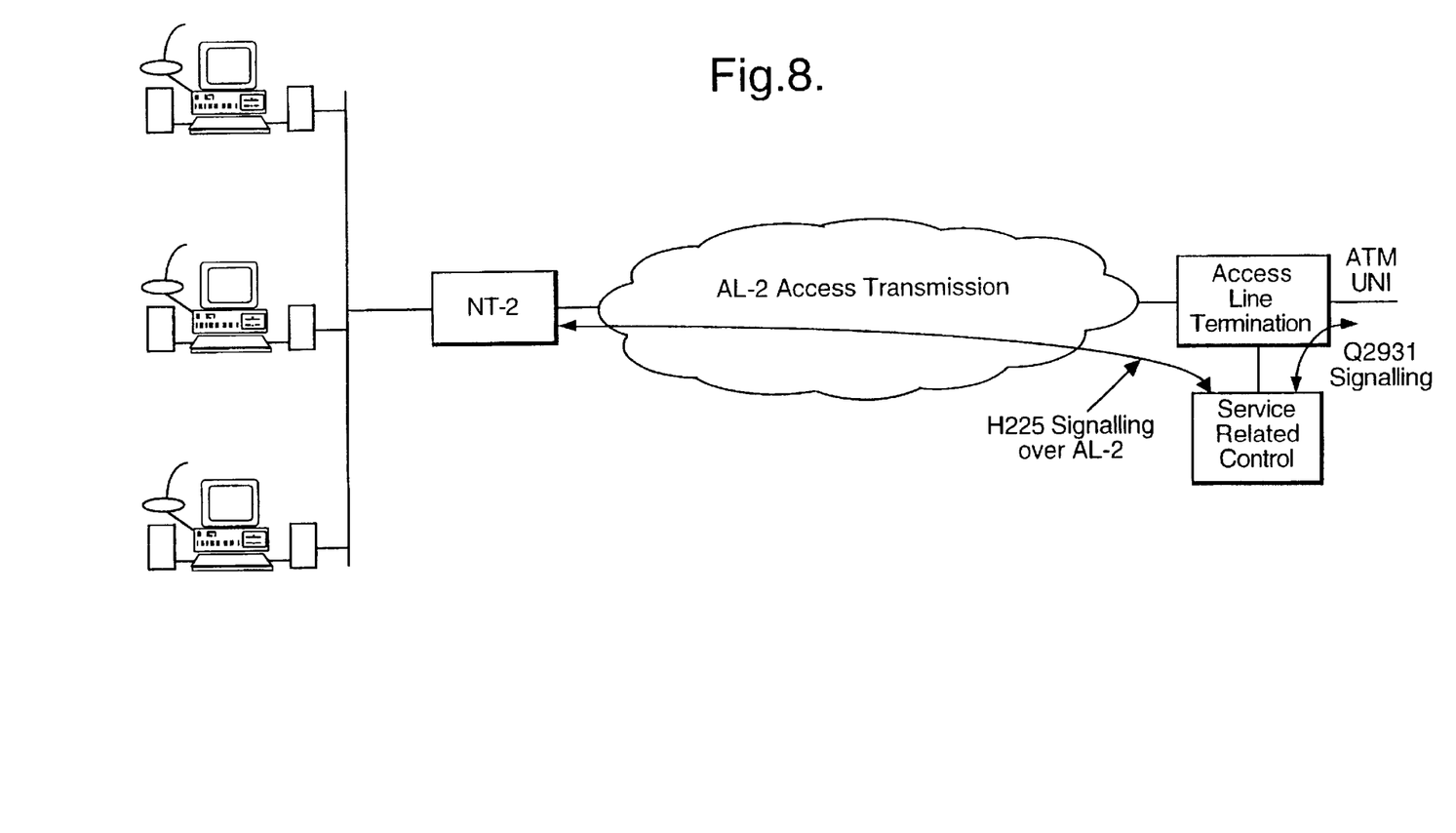
FIG. 8 illustrates the architecture of an access system employed in the network of FIG. 2.

The architecture of the access network is illustrated in FIG. 8. The core of the access system is an AL-2 Access Transmission network. At the customer premises, a Network Termination type 2 (NT-2) is provided which provides a LAN termination for all of the Multimedia PC's which are present on the site.

Figure 9:
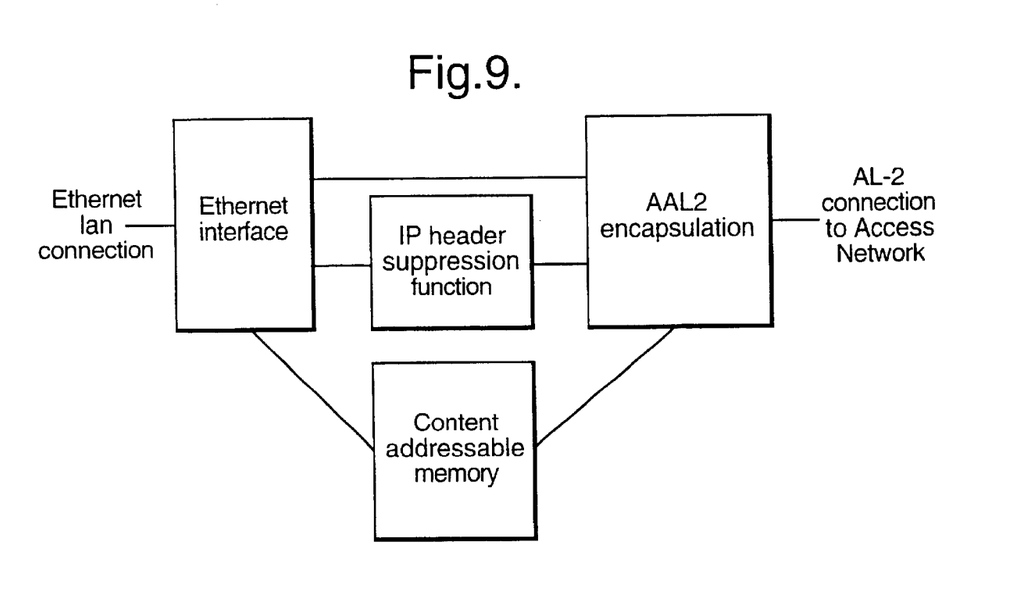
FIG. 9 illustrates the functional architecture of a customer premises network termination for use with the network of FIG. 2.

On the network side is an Access Line Termination function which provides access to a Service Related Control function and to a User Network Interface for interworking with the ATM Network. The functionality of the NT-2 is illustrated in FIG. 9. The two types of (P traffic which are dealt with in the NT-2 are, the traffic which flows transparently to and fro with the Internet, and the traffic which is cut-through in the ALS network. In the latter case, the knowledge that a connection is available in the ALS network can be utilised in order to suppress the IP headers for frames associated with these IP sessions. When a Q931 message exchange leads to the addition of a new party, then the IP address of that party together with the minichannel identifier for the session are placed in the Content Addressable memory of the NT-2. When frames arrive with this IP address for this session, the headers are suppressed and the content is forwarded on the open connection. Similarly in the reverse direction, when a frame is received on an open connection, the IP headers are reconstructed and the frame is forwarded on the Ethernet LAN. Where there are no open minichannel connections, the frames are encapsulated in AAL-2 and forwarded to the MPOA server function shown in FIG. 2 for onward routing to the Internet.

Although the arrangement and method have been describe above with particular reference to fixed networks, it will be understood that the principles described herein are equally applicable to wireless networks.

It will be understood that the above description of a preferred embodiment is given by way of example only and that various modifications may be made by those skilled in the art without departing from the spirit and scope of the invention.

What is claimed is:

1. A communications network arranged to provide multimedia switched services comprising a set of minichannel media components, wherein said set of minichannel media components is encapsulated in an ATM virtual circuit and is switched as an entity so as to provide connection records for usage based tariffing purposes, and wherein the minichannel components carry IP protocols and are switched using IP cut-through routing applied at the adaptation switching layer.

2. A communications network as claimed in claim 1, characterised in that said cut through routing is performed via a multi-protocol over ATM (MPOA) procedure.

3. A communications network as claimed in claim 1, characterised by an ATM core layer, an ATM virtual LAN layer, and an ATM adaptation switching layer for providing multimedia services to a user community.

4. A network as claimed in claim 1, 2 or 3, characterised by means for combining directly connected media sessions with a predetermined quality of service (QOS) together with Internet media sessions with best effort QOS.

5. A method of providing multimedia switched services to subscribers in a communications network, the method including encapsulating a set of minichannel media components in an AAL-2 VC, and switching the set of media components as an entity using robust signalling so as to provide connection records for usage based tariffing purposes, and wherein the minichannel components carry IP protocols and are switched using IP cut-through routing applied at the adaptation switching layer.

6. A method as claimed in claim 5, characterised in that said cut through routing is performed via a multi-protocol over ATM (MPOA) procedure.

7. A method as claimed in claim 5 or 6, characterised in that directly connected media sessions with a predetermined quality of service (QOS) are combined together with Internet media sessions with best effort QOS.

8. A method as claimed in claim 7, characterised in that simultaneous access of a plurality of users to Internet servers is provided via a switched virtual channel (SVC).

9. A method as claimed in claim 8, characterised in that said switched virtual channel allocates band width which can be used by any media component.

10. A method as claimed in claim 9, wherein access for users is determined by direct mapping of minicells to access transmission media.

* * * * *